US012370952B2

United States Patent
Watson et al.

(10) Patent No.: US 12,370,952 B2
(45) Date of Patent: Jul. 29, 2025

(54) COAXIAL ROTATING AUTOMATED STEPPING SURFACE

(71) Applicant: Magna Exteriors Inc., Concord (CA)

(72) Inventors: Bradley E. Watson, Barrie (CA); Deane Nelson, Toronto (CA); Jeffrey R. Johnson, White Lake, MI (US); Mark T. Pilette, Oxford, MI (US); Robert D. Brimm, Royal Oak, MI (US)

(73) Assignee: Magna Exteriors Inc., Aurora (CA)

( * ) Notice: Subject to any disclaimer, the term of this patent is extended or adjusted under 35 U.S.C. 154(b) by 329 days.

(21) Appl. No.: 17/867,995

(22) Filed: Jul. 19, 2022

(65) Prior Publication Data

US 2023/0021767 A1   Jan. 26, 2023

Related U.S. Application Data

(60) Provisional application No. 63/223,773, filed on Jul. 20, 2021.

(51) Int. Cl.
*B60R 3/02* (2006.01)
*B60R 3/00* (2006.01)

(52) U.S. Cl.
CPC ............... *B60R 3/02* (2013.01); *B60R 3/002* (2013.01)

(58) Field of Classification Search
CPC ...... B60R 3/02; B60R 3/002; B60Y 2400/405
See application file for complete search history.

(56) References Cited

U.S. PATENT DOCUMENTS

| | | | | |
|---|---|---|---|---|
| 4,278,054 A * | 7/1981 | Campen | .................. | F02P 17/00 123/149 D |
| 6,955,370 B2 * | 10/2005 | Fabiano | ................... | B60R 3/02 280/166 |
| 7,367,574 B2 * | 5/2008 | Leitner | ..................... | B60R 3/02 280/166 |
| 8,136,826 B2 * | 3/2012 | Watson | ..................... | B60R 3/02 280/166 |
| 10,538,204 B2 * | 1/2020 | Long | ....................... | B60R 3/002 |
| 10,618,472 B2 * | 4/2020 | Du | .......................... | B60R 3/002 |
| 2008/0042396 A1 * | 2/2008 | Watson | ..................... | B60R 3/02 280/727 |

FOREIGN PATENT DOCUMENTS

| | | | | |
|---|---|---|---|---|
| CA | 2299065 A1 * | 8/2000 | ............... | B60R 3/02 |
| CN | 118082693 A * | 5/2024 | ............. | B60R 3/007 |
| KR | 200437864 Y1 * | 1/2008 | | |

(Continued)

OTHER PUBLICATIONS

WO-2017085456-A1 English Translation (Year: 2017).*

(Continued)

*Primary Examiner* — James A Shriver, II
*Assistant Examiner* — Michael T. Walsh
(74) *Attorney, Agent, or Firm* — Warn Partners, P.C.

(57) ABSTRACT

A coaxial rotating automated stepping surface assembly adapted for a vehicle, including, at least one stepping surface portion, single pivot axis, coaxial motor arrangement to pivot axis, and complete system packaging out board of sill structure. The motor is a non back-drivable motor and is capable of operably self-locking in predetermined positions.

20 Claims, 13 Drawing Sheets

(56) References Cited

FOREIGN PATENT DOCUMENTS

KR      20180076873 A   *  7/2018
WO      WO-2017085456 A1 *  5/2017   ............... B60R 3/02

OTHER PUBLICATIONS

KR-20180076873-A English Translation (Year: 2018).*
CN-118082693-A English Translation (Year: 2024).*
KR-200437864-Y1 English Translation (Year: 2008).*
CA-2299065-A1 English Translation (Year: 2000).*
Office Action for Canadian Application No. 3,168,319 dated Aug. 28, 2024, 4-pages.

* cited by examiner

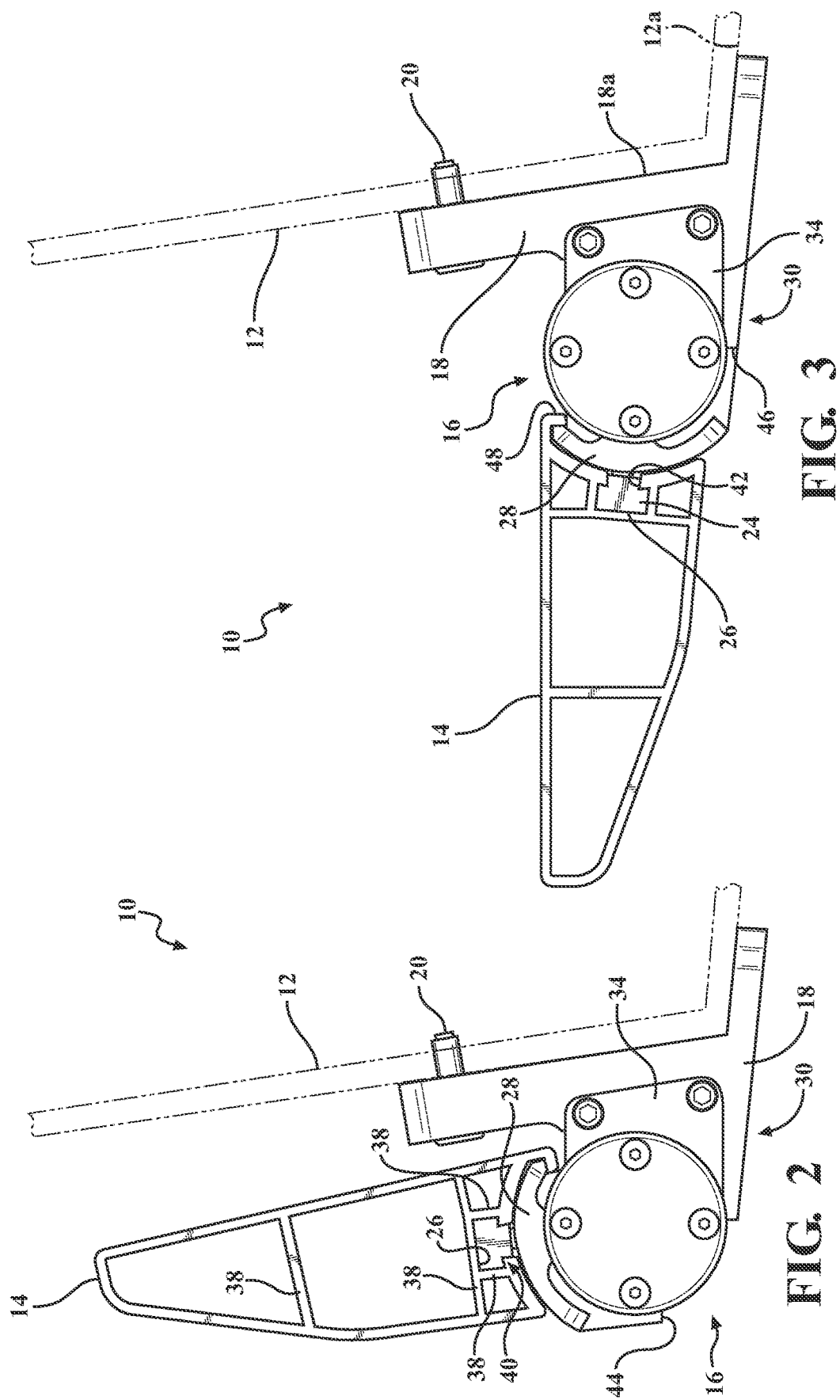

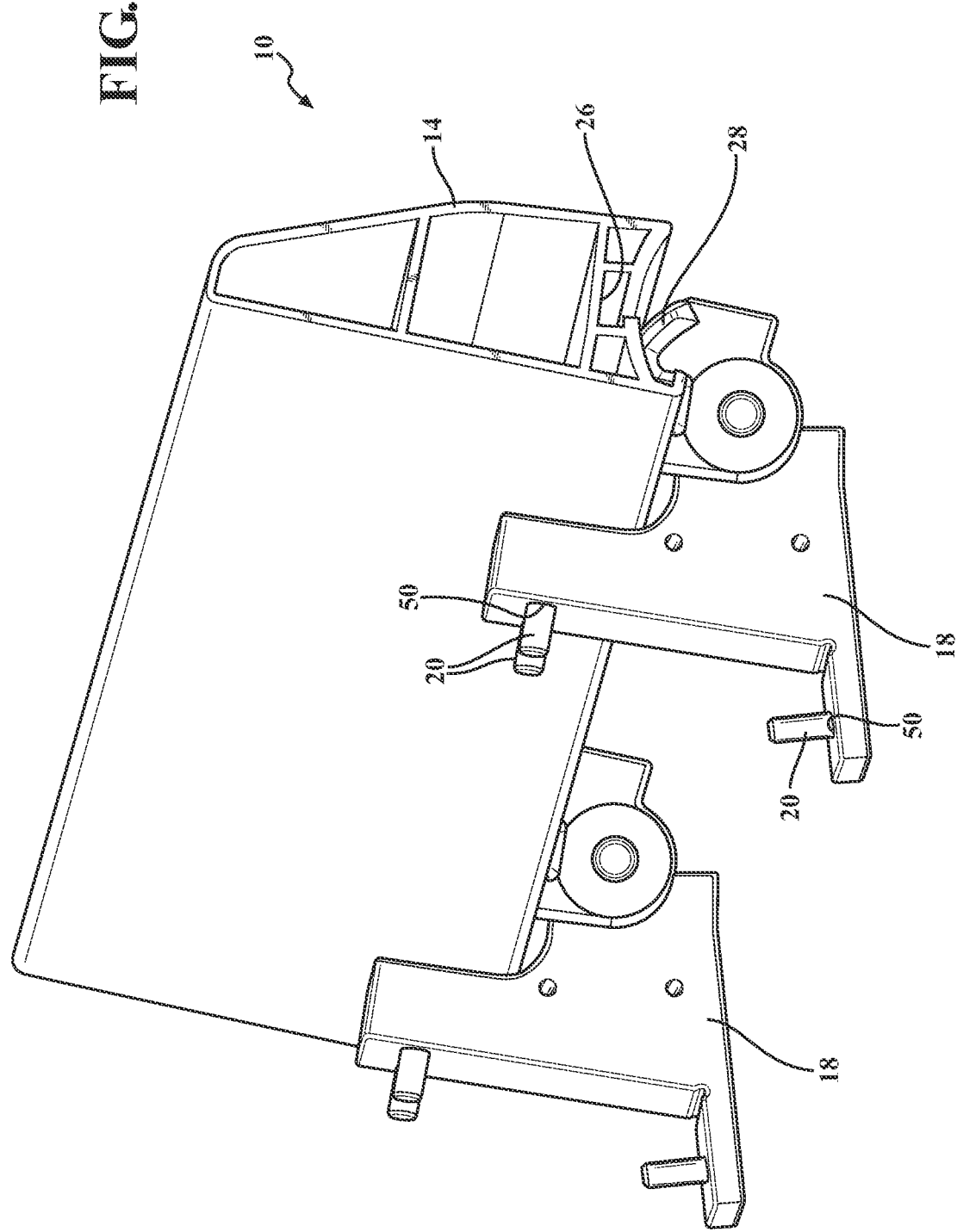

COAXIAL ROTATING AUTOMATED STEPPING SURFACE

CROSS-REFERENCE TO RELATED APPLICATIONS

This application is a Non-Provisional Patent Application and claims benefit of U.S. Provisional Patent Application No. 63/223,773, filed Jul. 20, 2021. The disclosure of the above application is incorporated herein by reference in entirety.

FIELD OF THE INVENTION

The present invention relates to a coaxial rotating automated stepping surface assembly adapted for a vehicle.

BACKGROUND OF THE INVENTION

Fixed or static running boards cannot be stowed. Stowable running boards can be bulky, require complex linkages, and take up more of a footprint than even fixed running boards.

Accordingly, there is a need for an automated stepping surface operably usable as a running board that provides good ergonomic benefits using predetermined package parameters (e.g., mounting to the outside of a sill structure).

SUMMARY OF THE INVENTION

A coaxial rotating automated stepping surface assembly adapted for a vehicle, including, at least one stepping surface portion, e.g., usable as a running board, single pivot axis, seat, coaxial motor arrangement to pivot axis, and complete system packaging outboard of sill structure. The motor includes at least one locking feature and is capable of operably locking in various predetermined positions. The coaxial rotating automated stepping surface assembly provides rotational deployment of the stepping surface portion to allow increased functionality where vehicle architecture is limited, or ground clearance is limited to the lowest vehicle element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a side elevation view of the coaxial rotating automated stepping surface assembly in an exemplary stowed position, in accordance with the present invention;

FIG. 3 is a side elevation view of the coaxial rotating automated stepping surface assembly depicted in an exemplary deployed position, in accordance with the present invention;

FIG. 7 is a perspective view of the coaxial rotating automated stepping surface assembly in an exemplary stowed position, in accordance with the present invention;

DETAILED DESCRIPTION OF THE PREFERRED EMBODIMENTS

The following description of the preferred embodiment(s) is merely exemplary in nature and is in no way intended to limit the invention, its application, or uses.

Referring to the figures generally, there is provided a coaxial rotating automated stepping surface assembly shown generally at 10 operably adapted for attachment to a vehicle 12 (e.g., sill outer panel). The assembly 10 provides good, if not better, ergonomic benefits using the same package parameters (e.g., mounting to the outside of a sill structure) as a static running board would.

Figure 1:
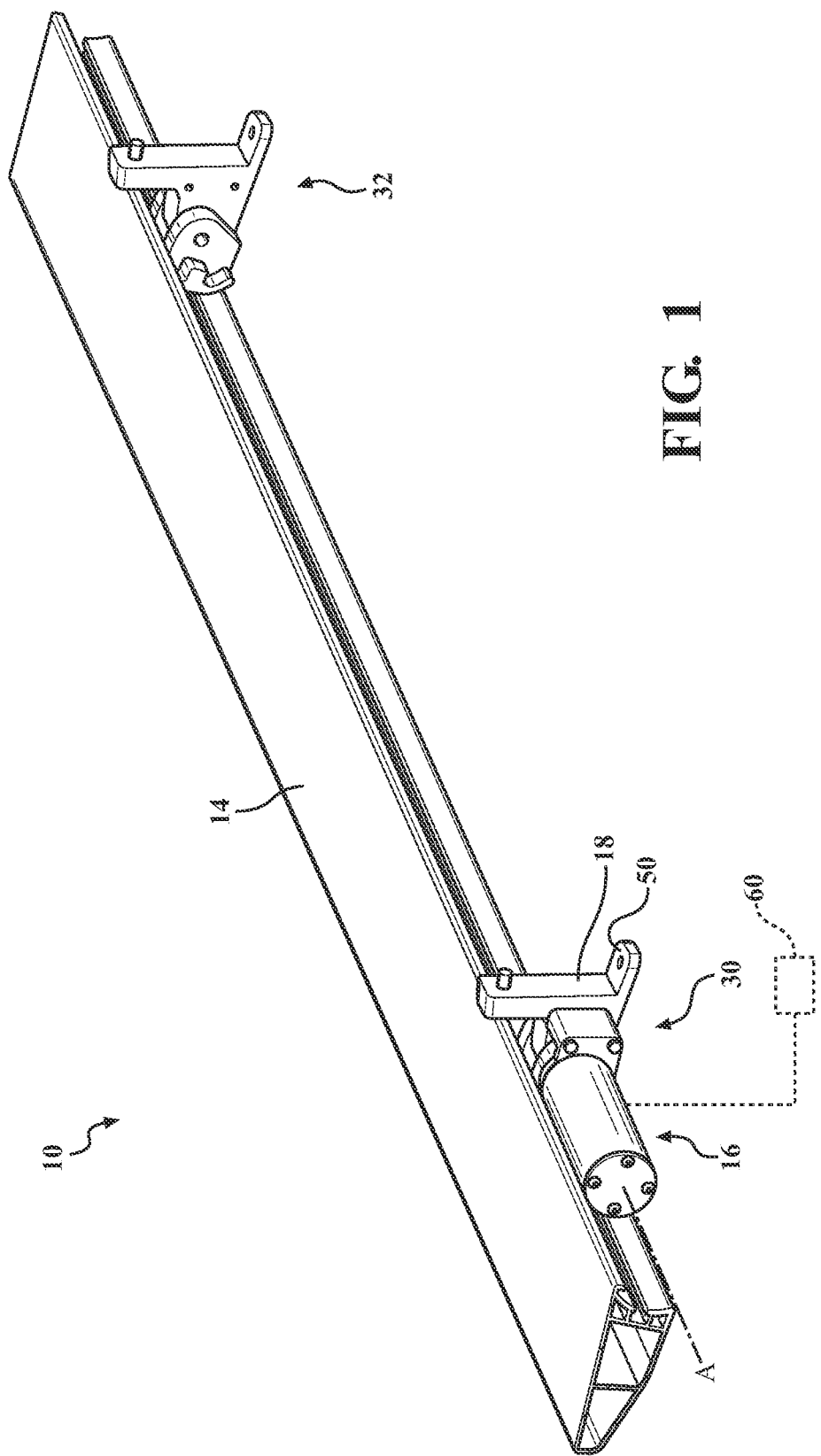
FIG. 1 is a perspective view of a coaxial rotating automated stepping surface assembly, in accordance with the present invention.
Figure 4:
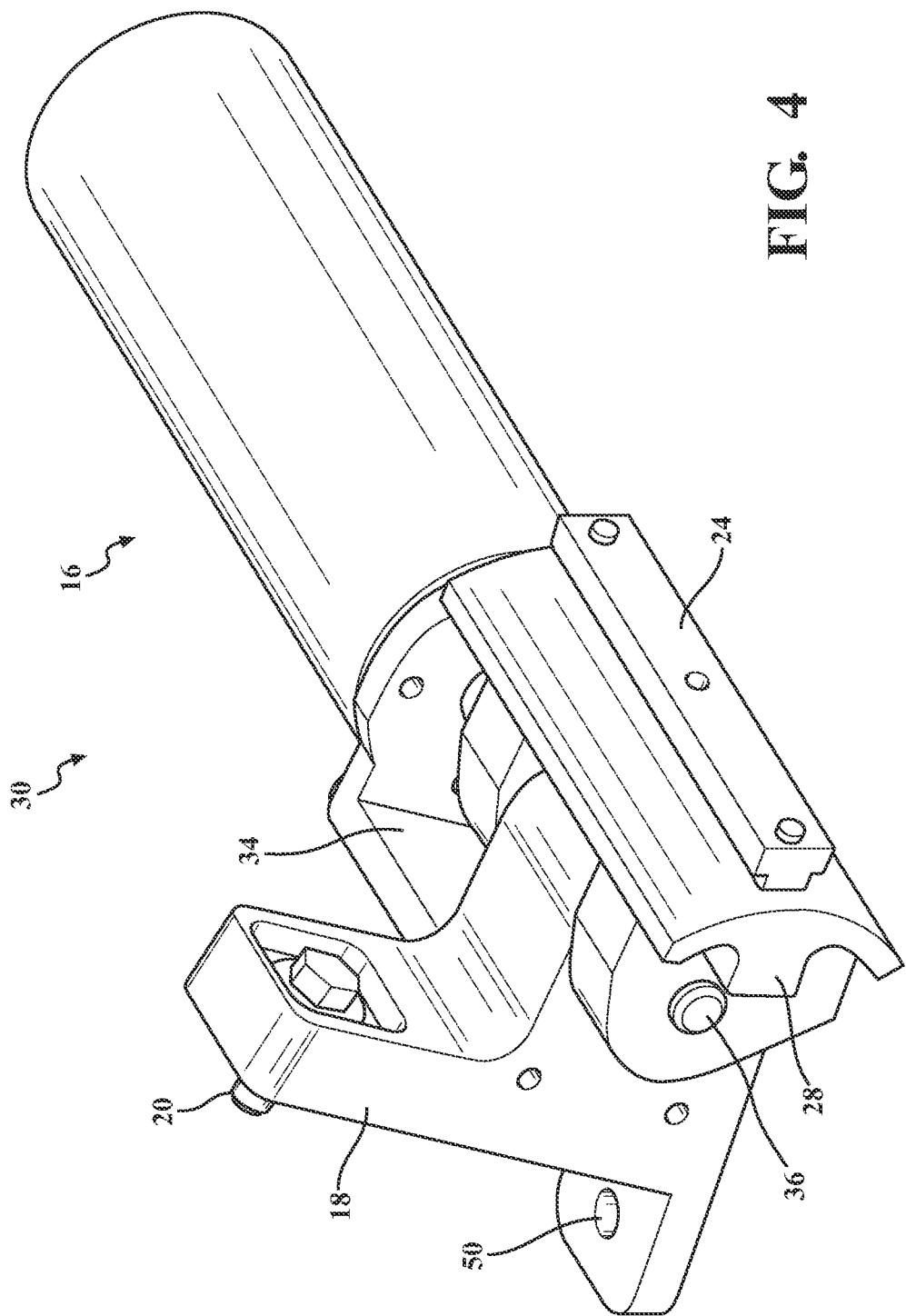
FIG. 4 is a perspective view of a drive link including a motor/actuator and rotational member, in accordance with aspects of the present invention.
Figure 6:
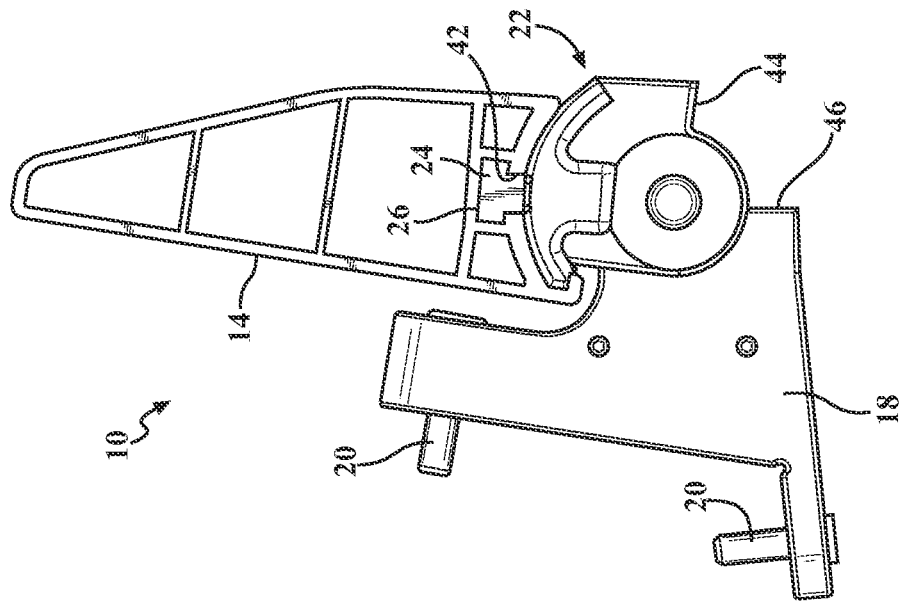
FIG. 6 is a perspective view of the coaxial rotating automated stepping surface assembly in an exemplary stowed position, in accordance with the present invention.
Figure 5:
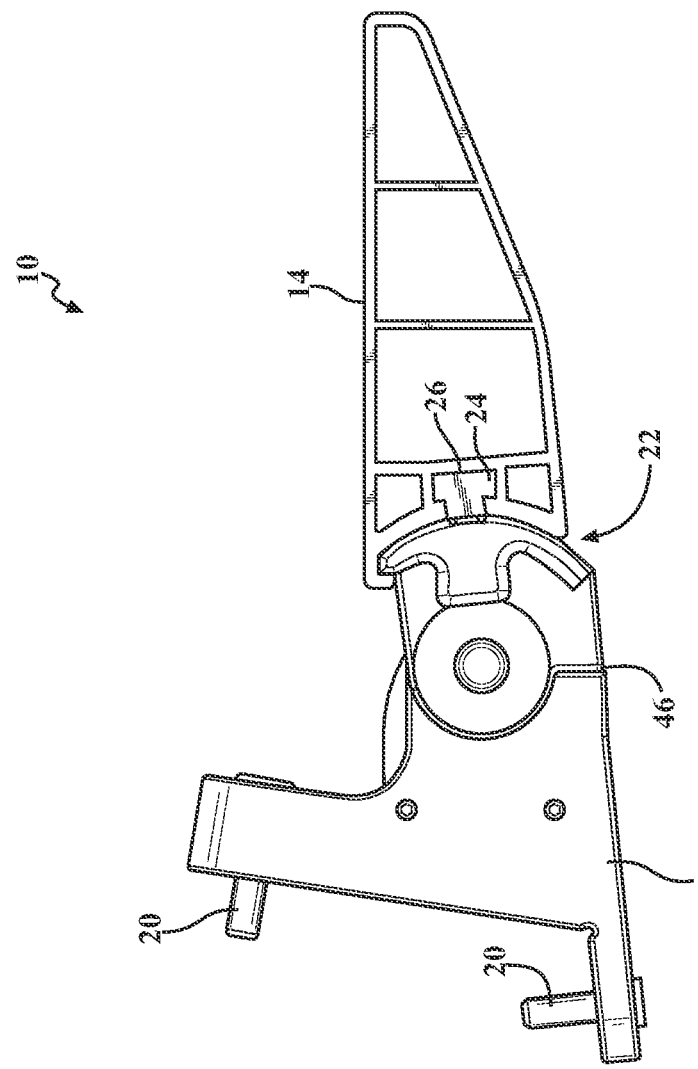
FIG. 5 is a side elevation view of the coaxial rotating automated stepping surface assembly depicted in an exemplary deployed position, in accordance with the present invention.
Figure 8:
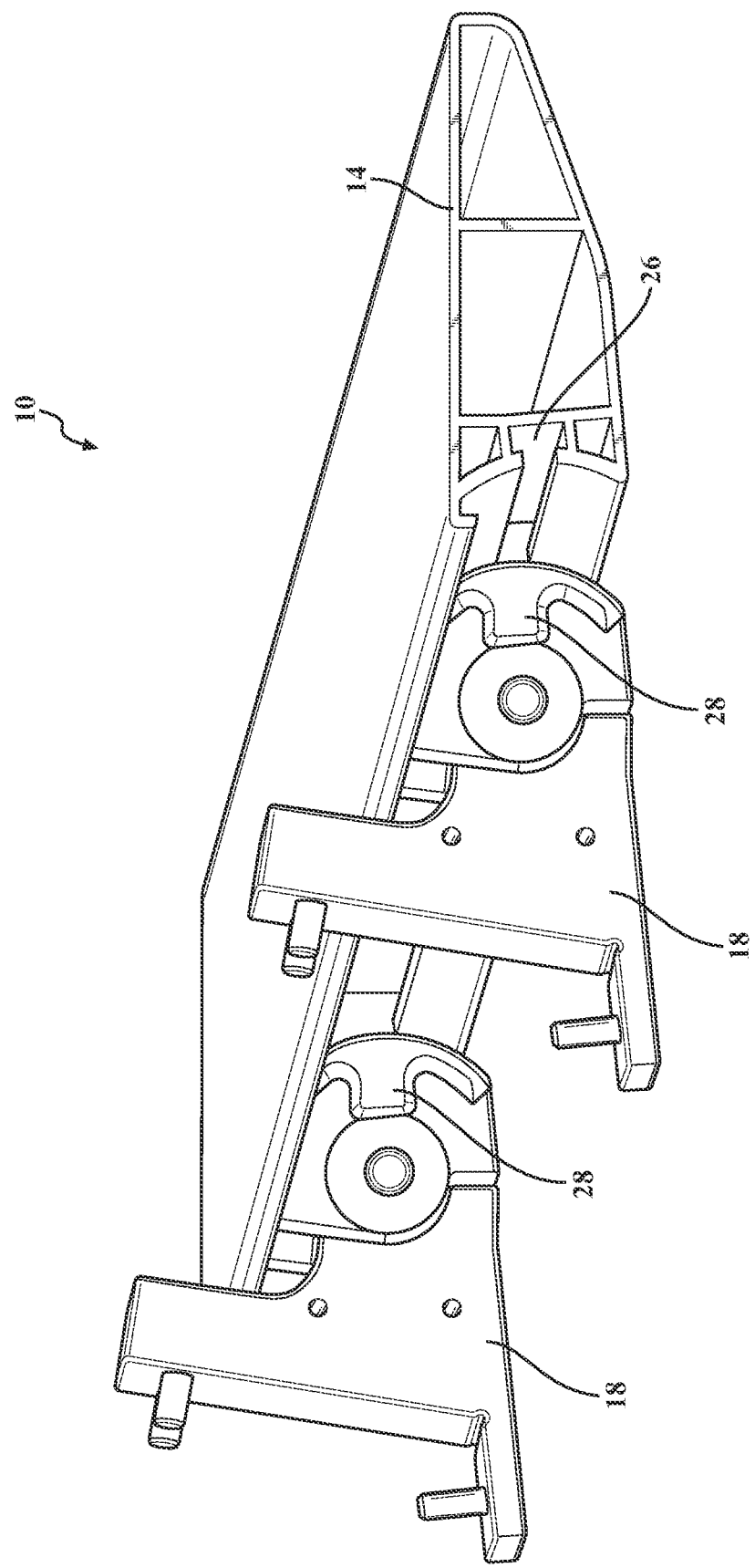
FIG. 8 is a perspective view of the coaxial rotating automated stepping surface assembly in an exemplary deployed position, in accordance with the present invention.
Figure 9:
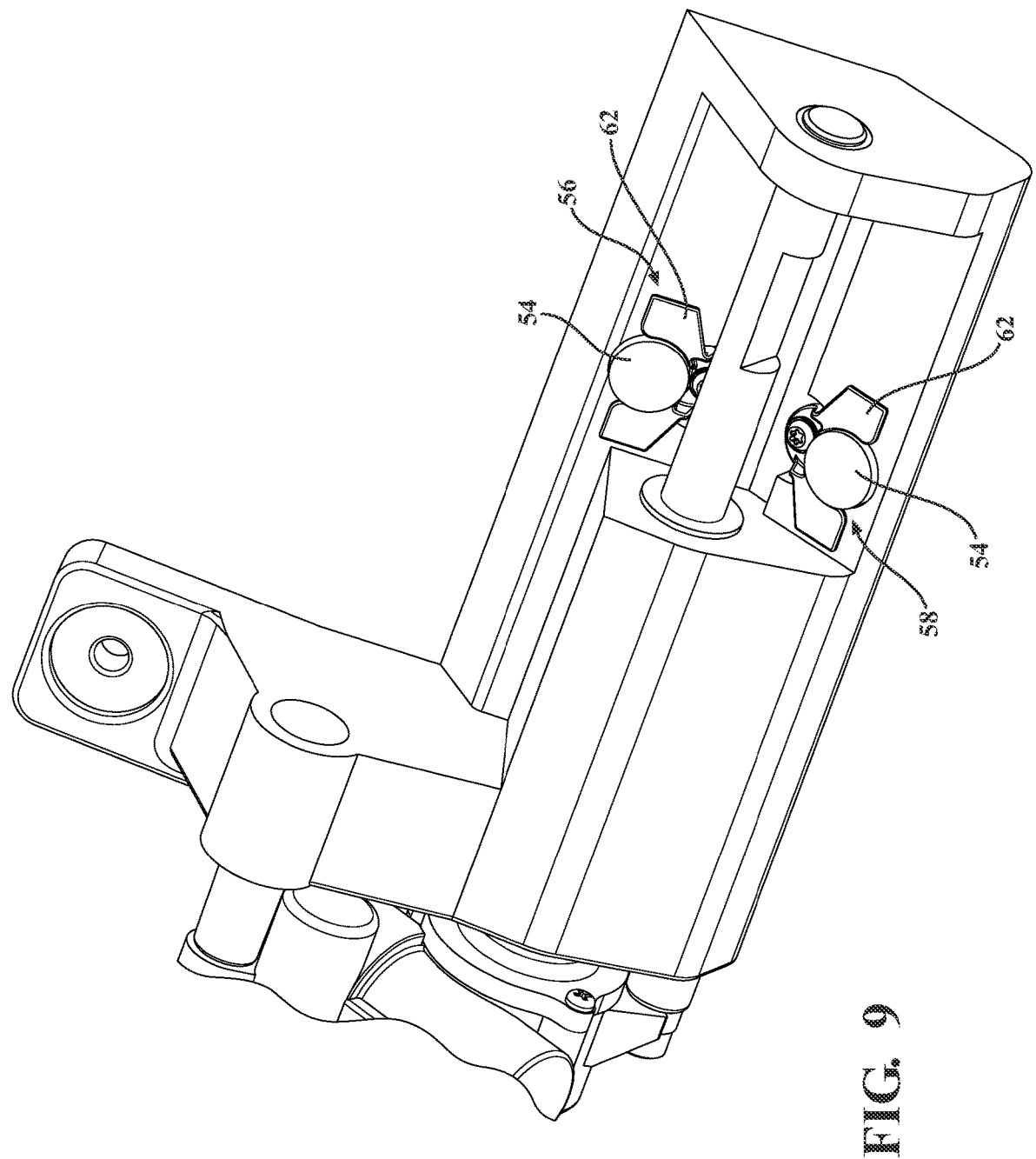
FIG. 9 is a perspective view of a drive link including stoppers, in accordance with aspects of the present invention.
Figure 10:
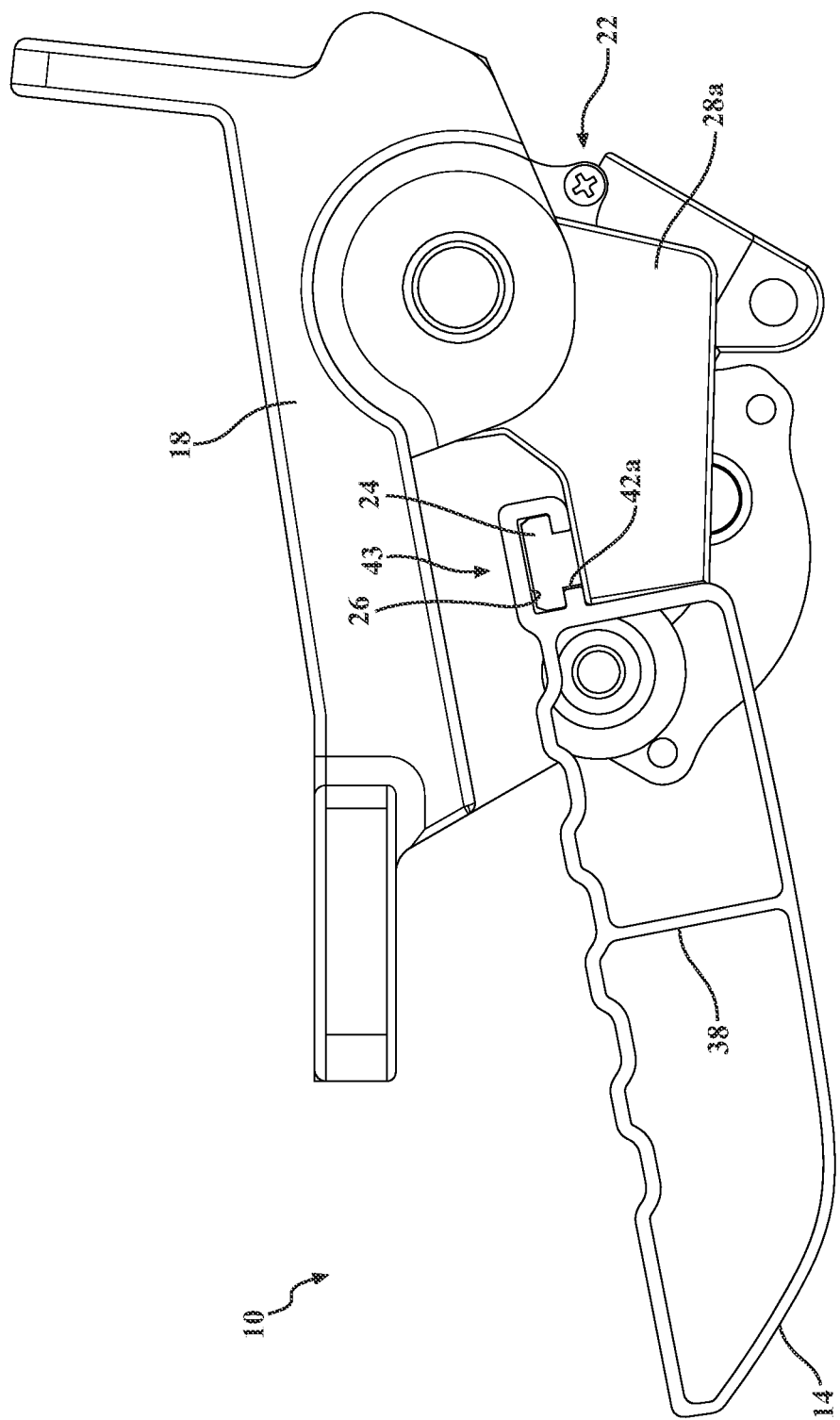
FIG. 10 is a side elevation view of a coaxial rotating automated stepping surface assembly, in accordance with the present invention.
Figure 11:
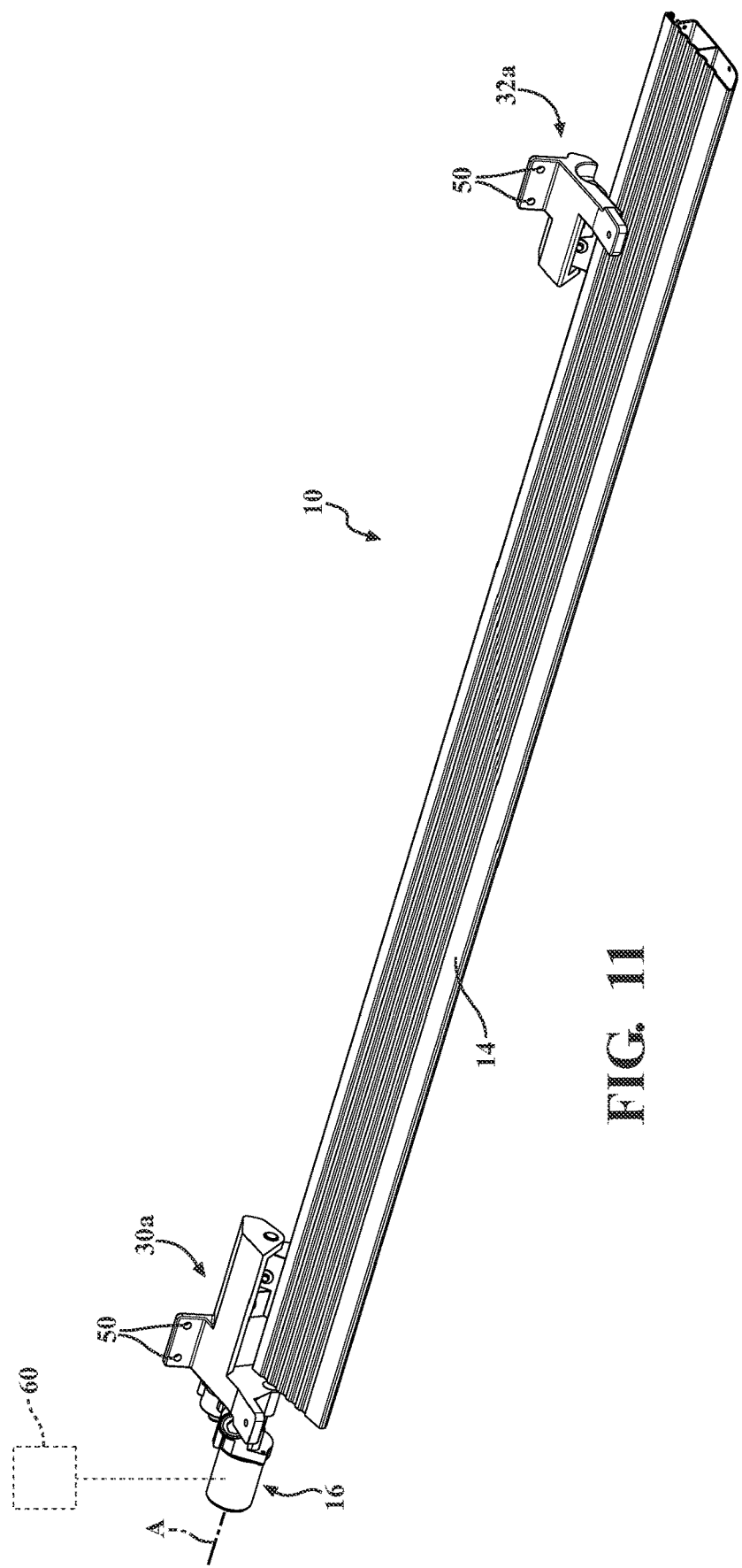
FIG. 11 is a perspective view of the coaxial rotating automated stepping surface assembly of FIG. 10, in accordance with the present invention.
Figure 12:
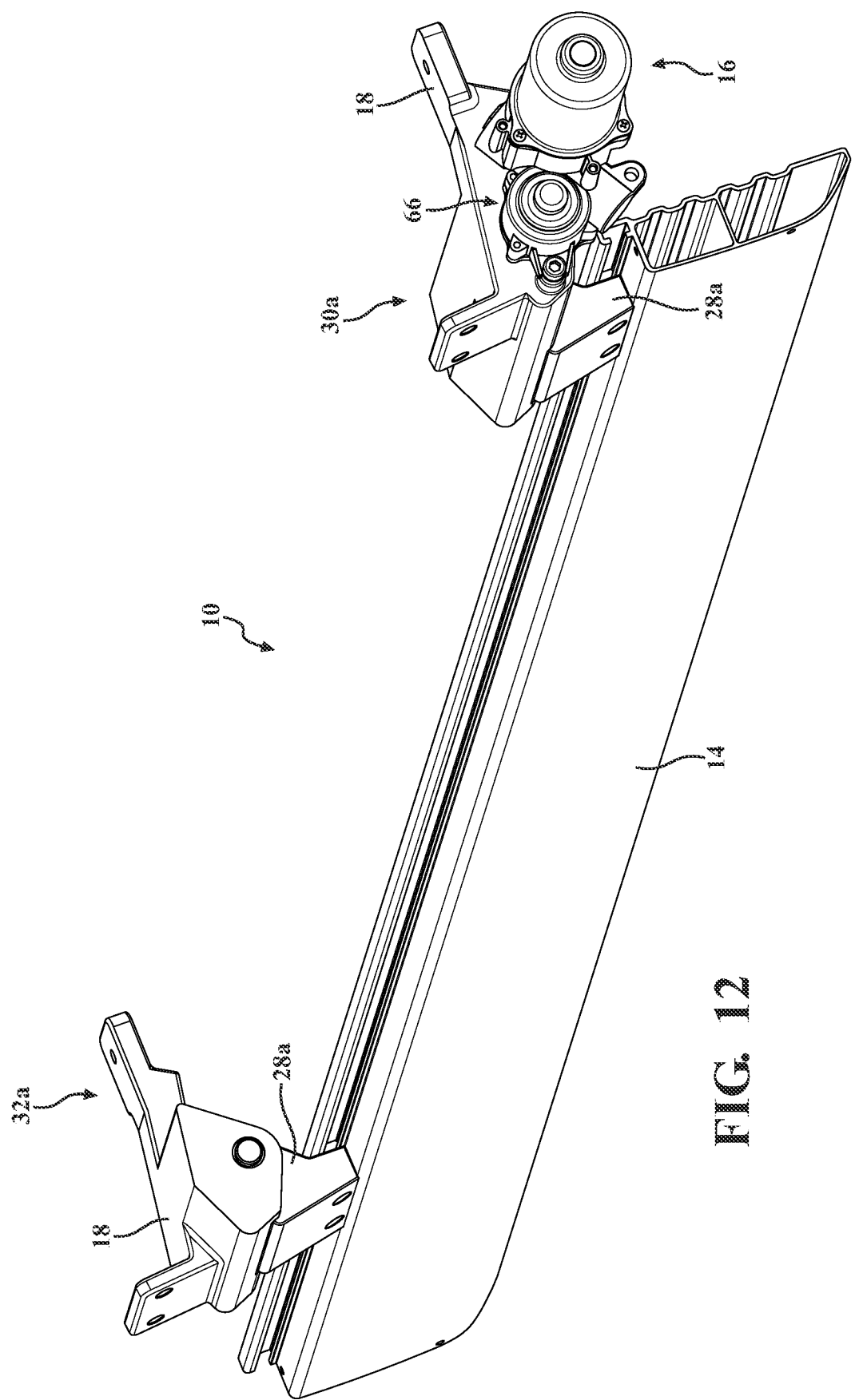
FIG. 12 is a perspective view thereof in an exemplary deployed position, in accordance with the present invention.
Figure 13:
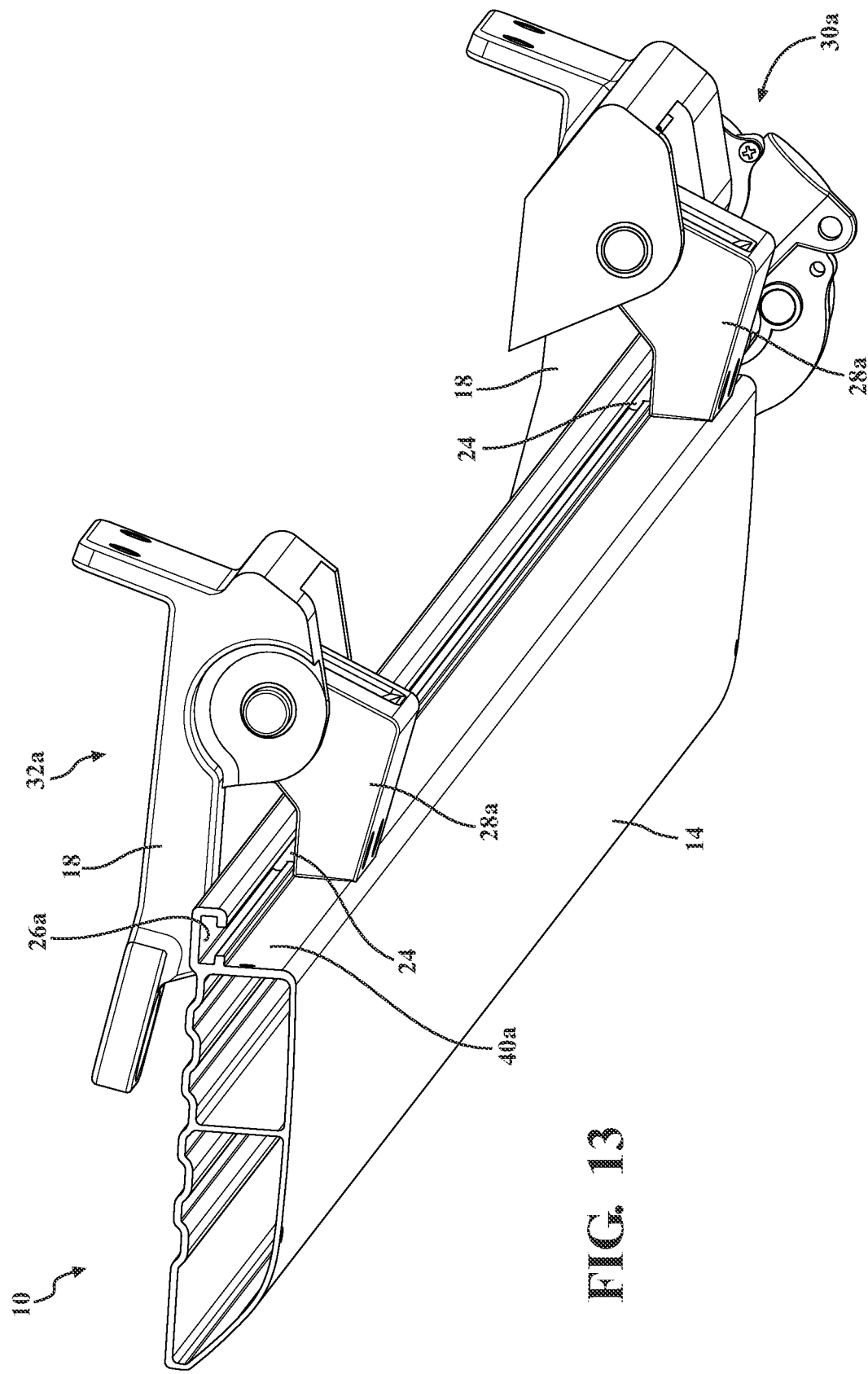
FIG. 13 is a perspective view thereof in an exemplary stowed position, in accordance with the present invention.
Figure 14:
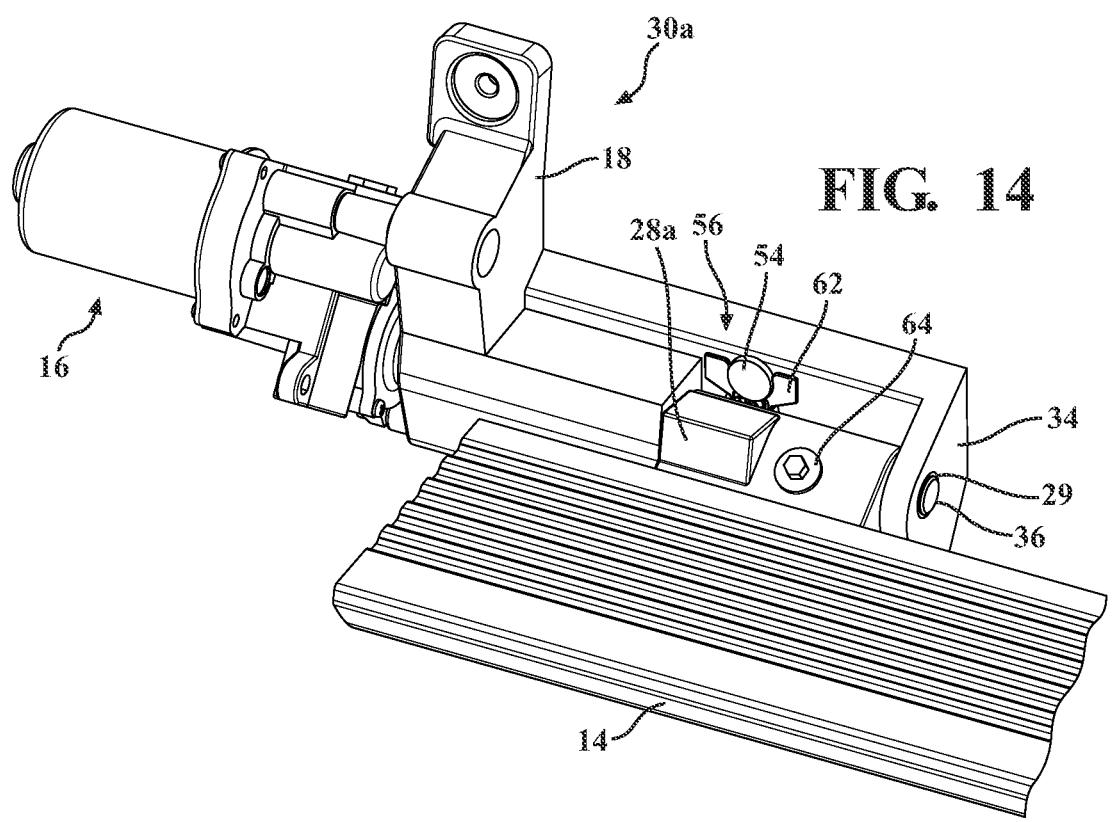
FIG. 14 is a top perspective view including a drive link including stoppers, in accordance with aspects of the present invention.
Figure 15:
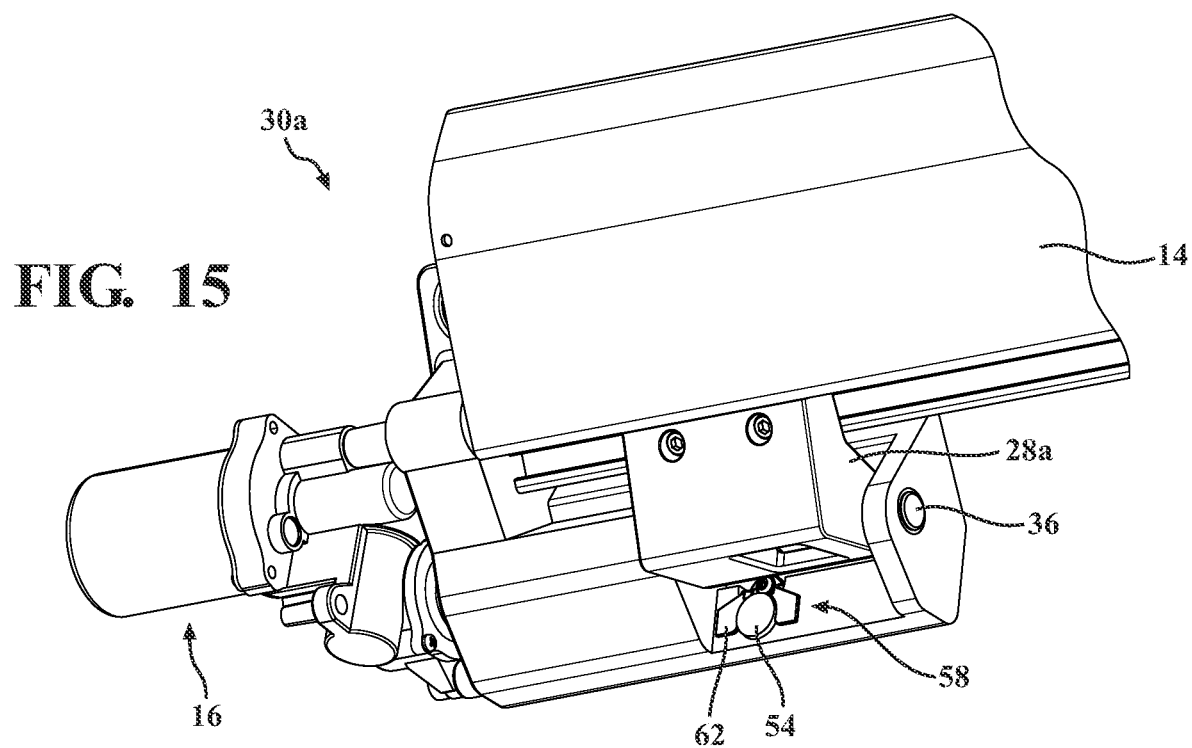
FIG. 15 is a bottom perspective view including the drive link including stoppers, in accordance with aspects of the present invention.

The assembly 10 includes at least one stepping surface portion 14 rotatable between at least one stowed position (e.g., generally up) and at least one deployed (e.g., rotated down to substantially horizontal step surface position). The stepping surface portion 14 is preferably a running board. The assembly incorporates a motor and actuator arrangement indicated generally at 16 operably to rotate the stepping surface portion 14. FIGS. 2, 6, 7 depict an exemplary stowed position. FIG. 1, 3, 5, 8 depict an exemplary deployed position.

The assembly 10 includes at least one bracket 18, preferably, at least two brackets 18 adapted to operably connect to the vehicle 12, preferably, a sill outer panel of the vehicle with at least one attachment member 20, most preferably, each connected with at least one fastener 20 (e.g., bolt, rivet, etc.), to an outward surface of a sill outer panel.

The assembly 10 includes at least one rotational locking feature indicated generally at 22 including at least one mounting member 24. The mounting member 24 is preferably received in a cooperating attachment portion 26, e.g., a predetermined shaped channel, formed in the stepping surface portion 14. The mounting member 24 is operably connected to or integrally formed with at least one rotational member 28 of said rotational locking feature 22 that rotates about the pivot axis (indicated generally at 'A') to rotate said at least one stepping surface portion 14 between at least one deployed position and a stowed position.

Preferably, each rotational locking feature 22 includes at least one mounting member 24, preferably, e.g., T-nut that are substantially T-shaped, received in at least one attachment portion 26, e.g., channel, located on said at least one stepping surface portion 14, each mounting member operably coupled to or integrally formed with a respective one of at least two rotational members 28 of at least a drive link indicated generally at 30 and an idler link indicated generally at 32. As the rotational members rotate about the pivot axis, the at least one stepping surface portion 14 rotates between at least the one deployed position and the stowed position. More or less links are contemplated without departure from the scope of the present invention. The board 14 is operably connected to at least one link support, e.g., at a pivot with a 'T' or other interface to the board.

The at least one mounting member 24 is a fastener, t-nut, direct bolt, integrally formed with the locking feature 22 and/or stepping surface portion 14, received in an L-channel, T-channel, welt, bulbous, or any other mounting member shape and dimensions suitable to connect at least one drive link to at least one stepping surface portion.

It is understood that any alternative shape, location, geometry and configuration is contemplated for the at least one mounting member 24 depending on the application without departure from the scope of the present invention.

The assembly 10 may be a single or double link. The assembly 10 includes at least one drive link 30 and may be a shorter step assembly with the drive link 30 being the only link, according to aspects of the present invention. The assembly 10 includes at least one drive link 30 and at least one idler link 32, according to aspects of the present invention.

The assembly 10 incorporates a rotary actuating stepping surface, e.g., an actuating running board, with a single rotation flipping the board down to step on and a single rotation flipping the board up to stow. The flip down design is especially beneficial in areas of limited space packaging parameters. The assembly 10 provides the highest clearance stepping surface.

The assembly 10 is operably adapted to couple to predetermined areas and architecture of the vehicle, such as, but not limited to, outside of the rocker of the vehicle. Mounted generally vertically to a sill, for example. The assembly 10 is adaptable to alternatively be operably mounted to at least one horizontal surface, e.g., the assembly 10 adapted generally horizontally to operably attach a mounting surface 18a to a substantially horizontal 12a sill (or other) surface. Front vehicle cross-member mounting, side box steps or rear box steps operably mounted to vehicle frame or sheet metal, truck, SUV, EV horizontal member, metal member, front end carrier module, hybrid, highly reinforced polypropylene, aluminum, etc. are contemplated.

According to aspects of the present invention, each bracket 18 includes a plurality of apertures 50 in predetermined locations adapted to operably connect the bracket 18 to predetermined vehicle structure with the plurality of predetermined fasteners 20, e.g., bolts.

A mounting bracket 34 operably connects each rotatable member 28 to the respective bracket 18 by at least one fastener 36, preferably, rotatably connected by a pin running through at least one aperture in both the bracket 18 and rotatable member 28. The drive link 30 includes the fastener 36, e.g., pin, operably connected to the motor/actuator member 16. According to aspects of the present invention, rotation of the drive link's 30 rotational member 28 and mounting member 24 in the attachment portion 26 causes the stepping surface portion 14 to rotate with 24/28 and, since the idler portion includes a mounting member 24 likewise in the attachment portion 26, the drive link and idler link rotate the stepping surface portion in unison.

The stepping surface portion 14 includes at least one rib 38, more preferably, a plurality of ribs 38. The attachment portion 26 is generally formed at a rear 40 of the stepping surface portion 14, e.g., an opening 42 is provided through a rear wall of the stepping surface portion 14 and forming the attachment portion 26 operable to receive the mounting member 24. Preferably, the mounting member 24 is slidable into the attachment portion 26, e.g., via end of channel opening, which attachment portion 26 is operable to prevent the mounting member 24 from backing out laterally or otherwise through the opening, e.g., narrower opening, of the attachment portion.

The assembly includes at least one stop. According to aspects of the present invention, the rotatable member 28 is provided with at least one mechanical stop 44. When the stepping surface portion 14 is rotated in a first direction to the down/deployed position, the stop 44 engages against an end surface 46 of the mounting bracket 34. It is understood that the stop 44 and abutting surface 46 may be located in any suitable locations depending on the application without departure from the scope of the present invention.

The stepping surface portion 14 includes at least one additional attachment surface 48, according to aspects of the present invention. Typically, the additional attachment surface 48 generally hooks around a back side of the rotating member 28, thereby further securing the stepping surface portion 14 to the rotatable member 28 to provide further attachment contact and further aide in stepping surface stability during rotation upward/downward and while in the up and down positions.

The actuator is a coaxial actuator. Preferably, the motor and the pivots are coaxial. It is understood that the actuator of the present invention is adaptable to alternatively be a linear actuator that pushes/pulls the stepping surface between stowed/deployed positions The motor 16 cannot be back-driven. For example, the motor shaft cannot be rotated by hand. The motor itself is a locking feature according to preferred aspects of the present invention. A lock in the motor is contemplated without departure from the scope of the present invention. Alternatively, at least one external lock feature is used, e.g., a mechanical lock built in to at least one link or mount.

The motor 16 is irreversible without power due to gearing. The efficiency is low enough that it cannot be back-driven. By way of example, a plurality of worm gears is used, e.g., two worm gears that prevent the back driving, especially relative to the second worm gear preventing back driving. Preferably, the motor 16 is two worm gear driven and the gears lock in. Preferably, the motor 16 is direct drive with gear reduction.

The motor 16 is a self-locking motor or non-back-drivable motor 16.

The stopping feature is a non-back-drivable motor, and sprag clutch, lock, brake, actuator lock in any position, or any other or alternative suitable stopping feature(s) are contemplated without departure from the scope of the present invention.

The motor 16 includes the at least one locking feature 22, e.g., rotational locking feature, and is capable of operably locking in various positions, e.g., retracted running board position, deployed step surface portion position, under vehicle retracted position, vehicle step-up, cab-step up, pickup truck bed step-up, semi-truck step-up, intermediated deployed position(s), front step-up, rear step-up, roof access step-up, etc. and any combinations thereof. The present invention is adaptable for connecting to any vehicle depending on the application, e.g., sport utility vehicle, pickup truck, recreational vehicle, etc. Preferably, the stepping surface portion is automatically deployable under predetermined conditions, e.g., door open detected, sensed condition, key fob detected, user switch actuated, etc. Preferably, the stepping surface portion automatically retracts under predetermined conditions, e.g., door closed detected, sensed condition, key fob detected, user switch actuated, etc. Preferably, the at least one stepping surface portion is an extrusion. Preferably, the stepping surface portion is a running board. While a sill outer panel is described, it is understood that the assembly is operably adaptable for any predetermined vehicle part and location depending on the application without departure from the scope of the present invention.

According to aspects of the present invention, at least one stopper 54 can be used that are limiting stoppers, preferably, at least one pair of stoppers 54. The pair of stoppers 54 are preferably located on the drive link 30 assembly. The motor 16 will provide rotation and will stall out in a still position on one stopper or the other. By way of example, in the still position with the stepping surface portion 14 retracted, the motor 16 is operably stalled out on a first stopper indicated generally at 56, e.g., an upper stopper; then when rotated to the deployed position, there is operable contact of a predetermined surface (e.g., a flange of the stepping surface portion 14) with a second stopper, indicated generally at 58, and the motor 16 will stall out in that still position. A Hall effect sensor, generally indicated by box 60 in the motor 16 generally measures position and the motor 16 is driven until it is stalled out and cuts the current. The stopper 54 is preferably compressible urethane (rubber, elastomer, or other suitable material are contemplated without departure from the scope of the present invention). Contact surfaces 62, e.g., formed of metal, adjoin each stopper 54. The stopper 54 then deflects, compresses or pushes out of the way of the contact surfaces 62. The stoppers 54 are preferably coupled to the mount 18. It is understood that the pair of stoppers 54 are locate in any predetermined suitable location depending on the application without departure from the scope of the present invention.

The assembly 10 is suitably adapted for predetermined ergonomic performance and parameters. The assembly 10 is suitable to provide an automated running board mechanism and kinematics that offer good ergonomics using the same package parameters (e.g., mounting to the outside of a sill structure of a vehicle) as a static running board. Concept is 3" in outboard of fixed step and 1 inch lower, both which should be a more favourable ergonomic design. The assembly 10 can be generally about 2 to 4 inches outboard of what fixed step position would be and about 2 inches lower, which is suitably adapted for more favorable predetermined ergonomic performance and parameters. Typically, the assembly is about 3 inches outboard of what a fixed step position would be and about 1 inch lower, which is suitably adapted for more favorable predetermined ergonomic performance and parameters.

Figure 16:
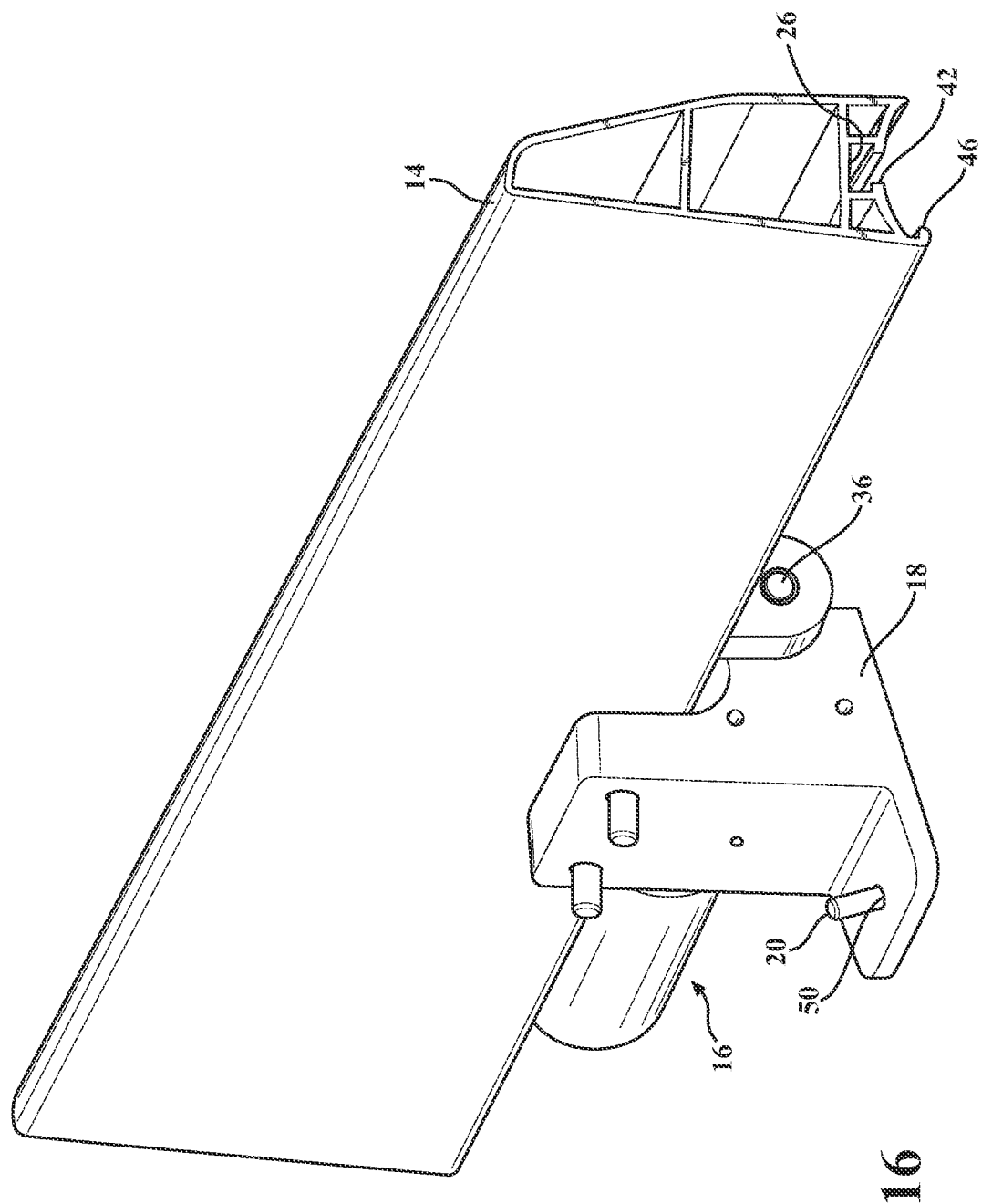
FIG. 16 is a perspective view of a coaxial rotating automated stepping surface assembly, in accordance with the present invention.

Referring now more particularly to FIG. 16, the assembly 10 is provided with a single link connected to the rotatable stepping surface 14. The assembly 10 is described and shown in greater detail as above, however, the assembly 10 includes the drive link 30 as the only link and may be a shorter step assembly of predetermined length (e.g., no idler link). As described in greater detail above, the mounting member 24 of the rotating member 28 is connected to the cooperating mounting portion 26. The features and function of the assembly 10 are described above and incorporated here.

Referring now more particularly to FIGS. 10-15, there is provided the coaxial rotating automated stepping surface assembly shown generally at 10 operably adapted for attachment to the vehicle (e.g., sill outer panel), substantially similar but including an upper attachment area for the stepping surface portion 14.

The assembly 10 includes the at least one stepping surface portion 14 rotatable between at least one stowed position (e.g., substantially up) and at least one deployed (e.g., rotated down to substantially horizontal step surface position). The assembly 10 is preferably an automated running board. The assembly 10 incorporates the motor and actuator arrangement indicated generally at 16 operably to rotate the stepping surface portion 14.

The assembly 10 includes at least one bracket 18, preferably, at least two brackets 18 adapted to operably connect to the vehicle 12, preferably, a sill outer panel of the vehicle with at least one attachment member 20, most preferably, each connected with the at least one fastener 20 (e.g., bolt, rivet, etc.) through the plurality of apertures 50, to an outward surface of a sill outer panel.

The assembly 10 includes at least one rotational locking feature indicated generally at 22 including the at least one mounting member 24. The mounting member 24 is preferably received in the cooperating attachment portion 26, e.g., a predetermined shaped channel, formed in the stepping surface portion 14. The mounting member 24 is operably connected to or integrally formed with at least one rotational member 28a of said rotational locking feature 22 that rotates about the pivot axis (indicated generally at 'A') to rotate said at least one stepping surface portion 14 in a first direction to at least one deployed position and in a second direction to a stowed position.

Preferably, each rotational locking feature 22 includes at least one mounting member 24, preferably, e.g., T-nut that are substantially T-shaped, received in the at least one attachment portion 26, e.g., channel, located on said at least one stepping surface portion 14, each mounting member 24 is operably coupled to or integrally formed with a respective one of at least two rotational members 28a of at least a drive link indicated generally at 30a and an idler link indicated generally at 32a. As the rotational members rotate about the pivot axis A, the at least one stepping surface portion 14 rotates between at least the one deployed position and at least one stowed position. More or less links are contemplated without departure from the scope of the present invention. The board 14 is operably connected to at least one link support, e.g., at a pivot with a CT or other interface to the board.

The at least one mounting member 24 is a fastener, t-nut, direct bolt, integrally formed with the locking feature 22 and/or stepping surface portion 14, and any combinations thereof, received in an L-channel, T-channel, welt, bulbous shape, or any other mounting member shape and dimensions suitable to connect the at least one drive link 30*a* to at least one stepping surface portion 14.

It is understood that any alternative shape, location, geometry and configuration is contemplated for the at least one mounting member 24 depending on the application without departure from the scope of the present invention.

The assembly 10 may be a single or double link. The assembly 10 includes at least one drive link 30*a* and may be a shorter step assembly with the drive link 30*a* being the only link, according to aspects of the present invention. The assembly 10 typically includes at least one drive link 30*a* and at least one idler link 32*a*, according to aspects of the present invention.

The assembly 10 incorporates a rotary actuating stepping surface, e.g., an actuating running board, with a single rotation flipping the board down to step on and a single rotation flipping the board up to stow. The flip down design is especially beneficial in areas of limited space packaging parameters. The assembly 10 provides the highest clearance stepping surface, which is particularly beneficial where vehicle architecture is limited or compact.

The assembly 10 is operably adapted to couple to predetermined areas and architecture of the vehicle, such as, but not limited to, outside of the rocker of the vehicle. Mounted generally vertically to a sill, for example. The assembly 10 is adaptable to alternatively be operably mounted to at least one horizontal surface, e.g., the assembly 10 adapted generally horizontally to operably attach a mounting surface to a substantially horizontal sill (or other) surface. Front vehicle cross-member mounting, side box steps or rear box step operably mounted to vehicle frame or sheet metal, truck, SUV, EV horizontal member, metal member, front end carrier module, hybrid, highly reinforced polypropylene, aluminum, etc. are contemplated.

According to aspects of the present invention, each bracket 18 includes the plurality of apertures 50 in predetermined locations adapted to operably connect the bracket 18 to predetermined vehicle structure with the plurality of predetermined fasteners 20, e.g., bolts.

The mounting bracket 34 operably connects each rotatable member 28*a* to the respective bracket 18 by at least one fastener 36, preferably, rotatably connected by a pin running through at least one aperture 29 in both the bracket 18 and rotatable member 28*a*. The drive link 30*a* includes the fastener 36, e.g., pin, operably connected to the motor/actuator member 16. According to aspects of the present invention, rotation of the drive link's 30*a* rotational member 28*a* and mounting member 24 in the attachment portion 26 causes the stepping surface portion 14 to rotate with 24/28 and, since the idler portion 32*a* includes a mounting member 24 likewise in the attachment portion 26, the drive link 30*a* and idler link 32*a* rotate the stepping surface portion 14 in unison.

The stepping surface portion 14 includes at least one rib 38, more preferably, a plurality of ribs 38. According to aspects of the present invention, the attachment portion 26 is generally formed at a top rear surface of the stepping surface. of the at a rear 40 of the stepping surface portion 14, e.g., an opening 42*a* is provided through an upper rear portion, indicated generally at 43, of the stepping surface portion 14 and forming the attachment portion 26 operable to receive the mounting member 24. Preferably, the mounting member 24 is slidable into the attachment portion 26, e.g., via end of channel opening 26*a*, which attachment portion 26 is operable to prevent the mounting member 24 from backing out laterally or otherwise through the opening, e.g., narrower opening, of the attachment portion. Optionally, at least one fastener 64 may be used to additionally secure the mounting member 24 at the installed running board portion 14 position.

The assembly can include at least one stop, as describe previously. According to aspects of the present invention, the rotatable member 28 is provided with at least one mechanical stop. When the stepping surface portion 14 is rotated in a first direction to the down/deployed position, the stop would engage against an predetermined surface of the mounting bracket 34 or other predetermined member. It is understood that the stop and abutting surface may be located in any suitable locations depending on the application without departure from the scope of the present invention.

The actuator is a coaxial actuator. Preferably, the motor and the pivots are coaxial. It is understood that the actuator of the present invention is adaptable to alternatively be a linear actuator that pushes/pulls the stepping surface between stowed/deployed positions.

The motor 16 cannot be back-driven. For example, the motor shaft cannot be rotated by hand. The motor itself is a locking feature according to preferred aspects of the present invention. A lock in the motor is contemplated without departure from the scope of the present invention. Alternatively, at least one external lock feature is used, e.g., a mechanical lock built in to at least one link or mount.

The motor 16 is irreversible without power due to gearing, e.g., including gearing housed in a housing indicated generally at 66. The efficiency is low enough that it cannot be backdriven. By way of example, a plurality of worm gears is used, e.g., at least two worm gears operable to prevent the back driving, especially relative to the second worm gear preventing back driving. Preferably, the motor 16 is two-worm gear driven and the gears operably lock in. Preferably, the motor 16 is direct drive with gear reduction.

The motor 16 is a self-locking motor or non-back-drivable motor 16.

The stopping feature is a non-back-drivable motor, and a sprag clutch, lock, brake, actuator lock in any position, or any other or alternative suitable stopping feature(s), and combinations thereof, are all contemplated without departure from the scope of the present invention.

The motor 16 is operable coupled with the at least one locking feature 22, e.g., rotational locking feature, and is capable of operably locking in various positions, e.g., retracted running board position, deployed step surface portion position, under vehicle retracted position, vehicle step-up, cab-step up, pickup truck bed step-up, semi-truck step-up, intermediated deployed position(s), front step-up, rear step-up, roof access step-up, etc. and any combinations thereof. The present invention is adaptable for connecting to any vehicle depending on the application, e.g., sport utility vehicle, pickup truck, recreational vehicle, etc. Preferably, the stepping surface portion is automatically deployable under predetermined conditions, e.g., door open detected, sensed condition, key fob detected, user switch actuated, etc. Preferably, the stepping surface portion automatically retracts under predetermined conditions, e.g., door closed detected, sensed condition, key fob detected, user switch actuated, hall effect sensor, etc. Preferably, the at least one stepping surface portion is an extrusion. Preferably, the stepping surface portion is a running board.

While a sill outer panel is described, it is understood that the assembly is operably adaptable for any predetermined vehicle part and location depending on the application without departure from the scope of the present invention.

According to aspects of the present invention, the at least one stopper 54 can be used that is a limiting stopper, preferably, at least one pair of stoppers 54. The pair of stoppers 54,54 are preferably located on the drive link 30*a* assembly. The motor 16 will provide rotation and will stall out in a still position on one stopper or the other. By way of example, in the still position with the stepping surface portion 14 retracted, the motor 16 is operably stalled out on a first stopper indicated generally at 56, e.g., an upper stopper; then when rotated to the deployed position, there is operable contact of a predetermined surface (e.g., a flange of the stepping surface portion 14) with a second stopper, indicated generally at 58, and the motor 16 will stall out in that still position. A Hall effect sensor, generally indicated by box 60 in the motor 16 generally measures position and the motor 16 is driven until it is stalled out and cuts the current. The stoppers 54 are preferably compressible urethane (rubber, elastomer, or other suitable material are contemplated without departure from the scope of the present invention). Contact surfaces 62, e.g., formed of metal, adjoin each stopper 54. The stopper 54 then deflects, compresses or pushes out of the way of the contact surfaces 62. By way of example, contact with the contact surfaces 62 allows a detectable current change and the current flow is then halted since this indicates the automated stepping surface portion 14 has reached a deployed or stowed position. The stoppers 54 are preferably coupled to the mount 18. It is understood that the pair of stoppers 54 are locate in any predetermined suitable location depending on the application without departure from the scope of the present invention.

Referring to the figures generally, the assembly 10 is preferably operably adapted for an electric vehicle. However, the assembly 10 is adaptable for any vehicle type and operably adapted to attach at any predetermined location.

The automated stepping surface assembly is operably adaptable as a running board, step accessory, step assist, box step, vehicle bed step, box step, side access, roof rack access, tailgate step, retractable step, assist step, vehicle front step, rear step, stadium seat, seat and step assist combination, and any combinations thereof. The automated stepping surface assembly is preferably usable as a running board.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coaxial rotating automated stepping surface assembly adapted for a vehicle, comprising:
   a stepping surface portion positionable adjacent to a pivot axis and rotatable about the pivot axis when positioned adjacent thereto;
   a rotational member including a mounting member operably connected to a longitudinal edge adjacent to and below a stepping surface of the stepping surface portion, the rotational member operably mounted to an actuator for driving by a motor, such that the actuator is coaxial with the pivot axis;
   wherein rotating said rotational member in a first direction by the actuator moves said stepping surface portion when connected to the mounting member to a deployed position, and rotating said rotational member by the actuator in a second direction moves said stepping surface portion when connected to the mounting member to a stowed position; and
   wherein the motor is a non-back-drivable motor adjacent the stepping surface portion operable to selectively lock said stepping surface portion in the deployed and stowed positions.

2. The coaxial rotating automated stepping surface assembly of claim 1, wherein said assembly incorporates operable automated stepping surface portion mechanics and kinematics adapted to provide predetermined ergonomics utilizing predetermined package parameters adapted for mounting to an outside of a sill structure of the vehicle.

3. The coaxial rotating automated stepping surface assembly of claim 1, wherein said non-back-drivable motor is self locking with gear reduction.

4. The coaxial rotating automated stepping surface assembly of claim 1, further comprising at least one mechanical stop to further assist in setting the rotation limits of said at least one rotational member.

5. The coaxial rotating automated stepping surface assembly of claim 1, wherein said drive link incorporates said motor operably mounted thereon.

6. The coaxial rotating automated stepping surface assembly of claim 5, further comprising at least one pair of stoppers operably coupled to said drive link, wherein when said rotational member is rotated in the first direction until said at least one stepping surface portion is moved to the deployed position, contact with a first stopper is operably detected and the motor current is stopped, and wherein when said rotational member is rotated in the second direction until said at least one stepping surface portion is moved to the stowed position, contact with a second stopper is operably detected and the motor current is stopped.

7. The coaxial rotating automated stepping surface assembly of claim 1, wherein said assembly is an automated running board adapted to operably connect to the vehicle to provide a step and/or seating surface for a user.

8. The coaxial rotating automated stepping surface assembly of claim 1, wherein said assembly is adapted to operably connect to a sill outer panel of the vehicle.

9. The coaxial rotating automated stepping surface assembly of claim 1, wherein said assembly includes said non-back-drivable motor.

10. The coaxial rotating automated stepping surface assembly of claim 1, wherein said non-back-drivable motor is substantially parallel to said stepping surface portion.

11. The coaxial rotating automated stepping surface assembly of claim 1, wherein said assembly includes at least two mounting brackets adapted to operably connect to the vehicle.

12. The coaxial rotating automated stepping surface assembly of claim 1, further comprising an idler link operably connected to said stepping surface portion, such that said assembly and said idler link assembly are spaced apart from one another along the pivot axis.

13. The coaxial rotating automated stepping surface assembly of claim 1, wherein said assembly is a single step comprising said drive link and no idler link.

14. The coaxial rotating automated stepping surface assembly of claim 1, wherein with a single first predetermined rotation of said rotational member, the stepping surface portion is flipped generally down to the deployed position as a substantially horizontal position, and with a second predetermined rotation of said rotational member, the stepping surface portion is flipped generally back up to the stowed position as a predetermined stowed position.

15. The coaxial rotating automated stepping surface assembly of claim 1, further comprising a drive portion assembly incorporating said motor mounted on said assembly to operably drive rotation of said stepping surface portion and an idler drive assembly operably connected to said stepping surface portion spaced apart from said assembly along the pivot axis, wherein said stepping surface portion is operably coupled to both said drive portion assembly and said idler drive assembly to rotate said stepping surface portion between the deployed position and the stowed position when actuated.

16. The coaxial rotating automated stepping surface assembly of claim 1, wherein said mounting member is received in an attachment member formed in said stepping surface portion, said mounting member operably connected to or integrally formed with said rotational member.

17. The coaxial rotating automated stepping surface assembly of claim 1, wherein the mounting member is substantially 'T'-shaped and received in a cooperating channel located on said at least one stepping surface portion, said mounting member operably coupled to or integrally formed with said rotational member, wherein as said rotational member rotates, said at least one stepping surface portion rotates between said deployed position and said stowed position.

18. A coaxial rotating automated stepping surface portion adapted for a vehicle, comprising:
  a stepping surface portion positionable adjacent to a pivot axis and rotatable about the pivot axis when positioned adjacent thereto;
  a rotational member including a mounting member operably connected to a longitudinal edge adjacent to and below a stepping surface of the stepping surface portion, the rotational member operably mounted to an actuator for driving by a motor, such that the actuator is coaxial with the pivot axis, wherein the motor is adjacent the stepping surface portion;
  wherein said assembly is operably adapted to connect at least one mounting bracket outboard of a sill structure of a vehicle, wherein the motor includes at least one locking feature and is capable of operably locking in various predetermined positions to provide said at least one stepping surface portion in at least a deployed position and a stowed position.

19. A coaxial rotating automated stepping surface assembly adapted for a vehicle, comprising:
  a stepping surface portion including a mounting portion;
  a drive link assembly including a rotational member operable to selectively rotate on a pivot axis to move said stepping surface portion between at least deployed and stowed positions;
  at least one mounting member operably integrally formed with or operably connected to said rotational member and operably connected to said mounting portion adjacent to and below a stepping surface of the stepping surface portion;
  an actuator connected to a non-back-drivable motor that is irreversible without power, such that the actuator is positioned on the pivot axis and connected to said rotational member, wherein the motor is adjacent the stepping surface portion.

20. The coaxial rotating automated stepping surface assembly of claim 19, further comprising at least one pair of stoppers operably coupled to said drive link, wherein when said rotational member is rotated in a first direction and said at least one stepping surface portion moves to the deployed position, contact with a first stopper is operably detected and current to the non-back-drivable motor is stopped, and wherein when said rotational member is rotated in a second direction and said stepping surface portion moves to the stowed position, contact with a second stopper is operably detected current to the non-back-drivable motor is stopped.

* * * * *